United States Patent [19]
Wassell

[11] 3,771,530
[45] Nov. 13, 1973

[54] COMBINE STONE STRAP
[75] Inventor: Donald Benjamin Wassell, Port Byron, Ill.
[73] Assignee: Deere & Company, Moline, Ill.
[22] Filed: June 19, 1972
[21] Appl. No.: 263,874

[52] U.S. Cl. ............................................. 130/27 JT
[51] Int. Cl. ............................................. A01f 12/20
[58] Field of Search .................................. 130/27 JT

[56] References Cited
UNITED STATES PATENTS
3,124,138  3/1964  Claas ............................. 130/27 JT
2,959,175  11/1960  Oberholtz et al. ............... 130/27 JT Primary Examiner—Antonio F. Guida
Attorney—H. Vincent Harsha et al.

[57] ABSTRACT

A combine has a main separator body with a forward crop inlet and a transverse threshing cylinder and concave mounted behind the crop inlet. A first transversely elongated trough-shaped stone trap part is mounted on the body immediately behind the lower edge of the crop inlet immediately in front of the concave. A second transversely elongated trough-shaped stone trap part is rigidly attached to the forward end of the concave and is vertically adjustable therewith. The second stone trap part spans the width of the concave immediately behind the first stone trap part and functions as a rearward extension of the first stone trap part to increase the stone trap capacity.

5 Claims, 3 Drawing Figures

Patented Nov. 13, 1973 3,771,530

COMBINE STONE STRAP

BACKGROUND OF THE INVENTION

This invention relates to an agricultural harvesting machine, and more particularly to an improved stone trap for preventing stones from entering the separating mechanism in a combine or the like.

A conventional combine has a forward crop inlet with an axially transverse threshing cylinder and a associated concave mounted in the main separator body of the combine immediately behind the crop inlet opening, the crop moving through the opening and passing between the threshing cylinder and concave. Since rocks are frequently picked up by the harvesting mechanism and are delivered through the crop inlet opening along with the crop, it has also become conventional to provide a stone trap, which will catch the stones or rocks before they can enter and damage the separating mechanism, while permitting the crop to proceed through the machine.

It is known to provide a stone trap in the form of a transversely elongated trough immediately in front of and at approximately the same level as the forward end of the concave, the trough spanning the width of the concave rearwardly adjacent to the lower edge of the crop inlet opening.

SUMMARY OF THE INVENTION

According to the present invention, an improved stone trap is provided between the inlet opening and the forward end of the concave. More specifically, a two-part stone trap is provided, the front part being mounted on the main separator body immediately behind the lower edge of the inlet opening, and the rear part being mounted on the front of the concave. An important feature of the improved stone trap resides in the fact that the capacity of the stone trap is increased by adding the rear part on the front of the concave.

Another feature of the invention resides in the fact that the stone trap capacity is increased without affecting the feeding characteristics of the crop to the threshing cylinder and concave. Also, the rear stone trap part shifts with the concave when the concave is adjusted to vary the clearance between the threshing cylinder and concave, and when the concave is adjusted for a wider opening, the size of the stone trap also increases.

Still another feature of the improved stone trap resides in the fact that the front stone trap part is attached to the main separator body so that there is no sealing problem between the front trap and the body, while the rear stone trap part is attached to the concave, eliminating any sealing problem between the stone trap and concave.

DESCRIPTION OF THE PREFERRED EMBODIMENT

Figure 1:
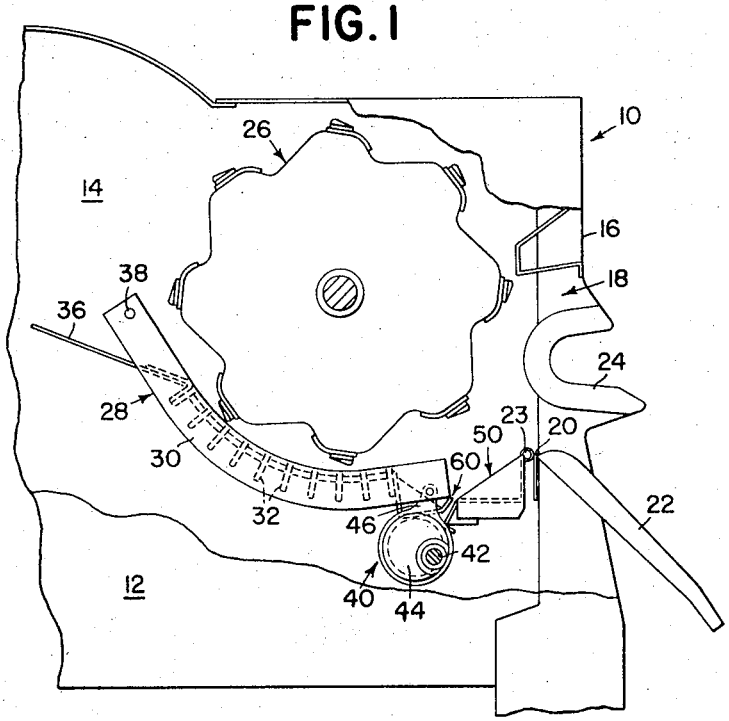
FIG. 1 is a side elevation view of the forward portion of the main separator body of a combine embodying the invention, a portion of the side wall of the combine being broken away to more clearly show the stone trap.

The invention is embodied in a combine having a main separator body indicated in its entirety by the numeral 10, only a forward portion of the body being shown in FIG. 1. The body has opposite upright side walls 12 and 14, and an upright front wall 16 having a generally rectangular inlet opening 18, which is transversely elongated and extends substantially the width of the body. The inlet opening has a transverse lower edge 20, and a vertically swingable plate or pan 22 is mounted on a hinge 23 on the lower edge 20 of the inlet opening. The pan 22 attaches to the underside of a conventional crop feeding housing (not shown), which is mounted on a transverse pivot carried by pivot brackets 24 on opposite sides of the inlet opening, the feeder housing being inclined downwardly and forwardly and being vertically adjustable about said pivot in a known manner. As is also well known, a harvesting platform (not shown) is mounted on the forward end of the feeder housing and removes the crop from the field, after which the crop is moved upwardly and rearwardly through the feeder housing and through the inlet opening 18 and passes between a threshing cylinder 26 and an associated concave 28.

The threshing cylinder rotates on a transverse axis and is disposed immediately behind the inlet opening 18, as is well known. The concave 28 includes a pair of arcuate side members 30 disosed adjacent to the opposite side walls 12 and 14. The side members extend through an arc of approximately 90° adjacent the lower rear quadrant of the cylinder and the center of curvature of the side members lies approximately on the axis of the cylinder 26. As is apparent, a portion of each side member lies ahead of the axis of the cylinder, and that portion extends forwardly and slighlty upwardly in a tangential direction. Also, the rearward portions of the side members extend upwardly and rearwardly in a generally tangential direction.

A plurality of transverse concave bars 32 rigidly connect and extend between the opposite side members 30, the bars 32 having a rectangular cross section with their longer sides extending in a generally radial direction relative to the cylinder 26. As is apparent, the bars are spaced at regular fore-and-aft intervals along the arcuate central portions of the side members, which extend roughly 60°. Thus, the front transverse bar 32 is rearwardly offset from the front of the side members 30, and the rear bar is offset a somewhat greater distance from the rearward end of the side members. A plurality of arcuate rods 34 extend in a generally fore-an-aft direction through the bars 32 at regular laterally spaced intervals across the width of the concave, the forward and rearward ends of the rods being respectively attached to the front and rear concave bars. As is apparent, the rods 34 have the same curvature as the arcuate portion of the side members, and the transverse bars 32 and the fore-and-aft rods 34 form a grate-like concave through which most of the grain falls as the crop is threshed between the cylinder and concave. A plurality of fingers 36 extend upwardly and rearwardly from the rear bar 32 toward the straw walkers (not shown) in the known manner.

The concave 28 is adjustable about a pair of transversely aligned pivots 38, which respectively connect the rearward ends of the side members 30 to the respective side walls 12 and 14. The adjustment is accomplished by an adjusting mechanism 40 which shifts the forward end of the concave so that the entire concave swings about the axis of the pivots 38 to vary the clearance between the cylinder 26 and the upper edges of the concave bars 32. The adjusting mechanism 40 is of known construction and includes a transverse shaft 42 which spans the width of the body and is rotatable by the operator through any suitable mechanism. A pair of circular arms 44 are eccentrically mounted on the shaft 42 adjacent the opposite side of the concave, and a pair of annular cam followers 46 are mounted on the cams 44 and are respectively connected to the forward ends of the side members 30. As is apparent, rotation of the shaft 42 rotates the eccentric cams 44 causing the followers and the forward ends of the concave side members 30 to move in a generally vertical direction about the axis of the pivots 38.

A front, transversely elongated, trough-shaped stone trap part 50 is mounted on the main separator body 10 immediately behind and below the lower edge 20 of the inlet opening. The front stone trap part 50 spans the width of the body and includes a pair of generally triangular side members 52 adjacent the opposite side walls 12 and 14. A generally upright front wall 54 extends between the side members 52 and has its upper end connected to the hinge 23, while a generally horizontal bottom 56 extends rearwardly from the lower edge of ghe front wall 54. An inclined lip 58 extends downwardly and rearwardly from the rearward end of the bottom 56. All of the above represents more or less known stone trap construction, and, as is apparent, rocks or stones moving through the inlet opening 18 with the grain drop into the upwardly open stone trap part 50, while the crop moves rearwardly between the cylinder and concave.

A rear stone trap part 60 is mounted on the forward end of the concave 28 and functions as a rearward extension of the front stone trap part 50. As previously indicated, the concave side members 30 extend forwardly from the forward transverse bar 32, and a pair of L-shaped braces 62 respectively extend between the front bar 32 and the forward ends of the side members 30 closely adjacent to the side members. The rear stone trap part is disposed between the braces 62 and has a slightly lesser width than the front stone trap part 50. The rear stone trap part 60 is also trough-shaped and upwardly open and includes a pair of generally triangular side members 64 and a generally upright rear wall 66, which is rigidly attached to the front side of the front bar 32 by a plurality of removable fasteners 68. A generally horizontal bottom 70 extends forwardly from the lower edge of the rear wall 66, and an inclined lip 72 extends upwardly and forwardly from the forward end of the bottom 70 closely adjacent to and parallel to the inclined lip 58 on the front stone trap part 50.

Figure 2:
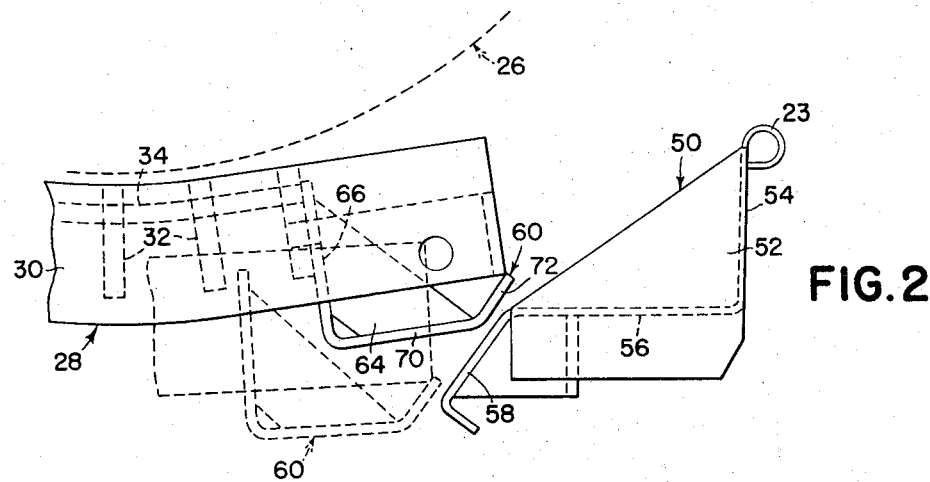
FIG. 2 is an enlarged side elevation view of the improved stone trap, with the concave set for a minimum opening, the position of the rear part of the stone trap when the concave is set for a maximum opening being illustrated in dotted lines.
Figure 3:
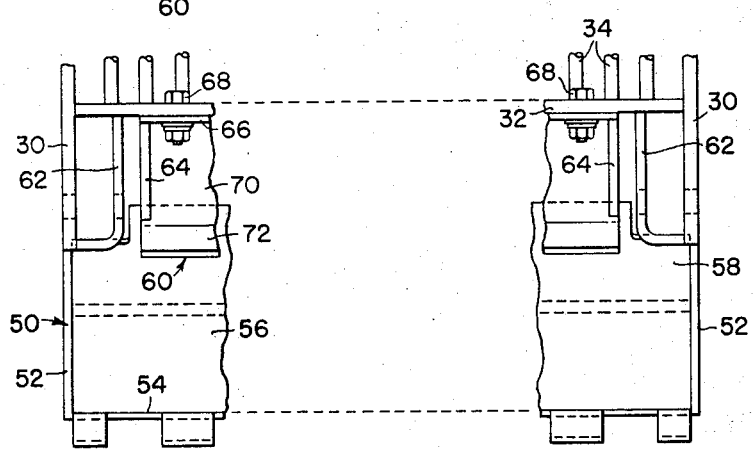
FIG. 3 is a plan view of the stone trap and the forward end of the concave.

When the concave is adjusted for a minimum opening, the bottom 70 of the rear stone trap part 60 is substantially at the same level as the bottom 56 of the front stone trap part 50, so that the front and rear stone trap parts conjunctively form an upwardly open channel-shaped trap, with the closely adjacent lips 58 and 72 functioning as a seal between the front and rear traps. As shown in dotted lines in FIG. 2, when the concave is adjusted for maximum opening, the rear stone trap 60 swings downwardly and rearwardly, providing a larger overall stone trap. As is apparent, the lips 58 and 72 still slightly overlap, to maintain the seal between the front and rear traps.

We claim:

1. In a harvester including a main separator body having a forward crop inlet opening with a generally horizontal, transverse lower edge and an axially transverse threshing cylinder and an associated concave mounted in the body behind the inlet opening and adapted to receive crop material moving through the inlet and thresh the crop as it passes between the cylinder and concave, the combination therewith of an improved stone trap comprising: an elongated, transversely extending, front, trough-shaped, upwardly open stone trap part mounted on the body and substantially spanning the width of the inlet opening between the front of the concave and the lower edge of the inlet opening; and an elongated, transversely extending, trough-shaped, upwardly open, rear stone trap part mounted on and substantially spanning the width of the concave immediately to the rear of the front stone trap part, the rear stone trap part forming a rearward extension of the front part, the forward end of the concave being adjustable to vary the clearance between the cylinder and concave, and the rear stone trap part shifting relative to the front part when the concave is adjusted.

2. The invention defined in claim 1 wherein the concave includes a pair of arcuate, fore-and-aft side members and a plurality of transverse bars extending between the side members, the forward ends of the side members extending forwardly of the front bar and the rear stone trap part being attached to the front bar and disposed between the forwardly extending portions of the side members.

3. The invention defined in claim 2 wherein the rear stone trap part includes a generally upright rear wall attached to the front bar and a generally horizontal bottom extending forwardly from the rear wall, the rear stone trap part having an upwardly and forwardly facing opening.

4. The invention defined in claim 3 and including a lip extending upwardly and forwardly from the front of the rear stone trap part bottom.

5. In a combine having a main separator body with a forward crop inlet and a transverse threshing cylinder and an associated concave mounted in the body adjacent to the inlet and adapted to thresh crop material moving between the cylinder and concave, the concave including a pair of arcuate fore-and-aft side members and a plurality of transverse bars, the improvement comprising: a first transversely elongated, trough-shaped stone trap rigidly attached to the concave forwardly of the front concave bar, and substantially spanning the distance between the forwardly extending portions of the side members, the stone trap having an upwardly and forwardly facing opening rearwardly of the crop inlet, a generally upright rear wall fixed to the front concave bar, a generally horizontal bottom, and an upwardly and forwardly extending lip at the front of the bottom; and a second trough-shaped stone trap mounted in the body forwardly of the first stone trap and including a generally horizontal bottom and an inclined lip extending downwardly and rearwardly from the rear of the second stone trap bottom parallel and closely adjacent to the lip on the first stone trap.

* * * * *